United States Patent [19]

Kanno

[11] Patent Number: 5,701,364
[45] Date of Patent: Dec. 23, 1997

[54] IMAGE PROCESSING APPARATUS

[75] Inventor: Hiroki Kanno, Yokohama, Japan

[73] Assignee: Kabushiki Kaisha Toshiba, Kawasaki, Japan

[21] Appl. No.: 405,295

[22] Filed: Mar. 16, 1995

[30] Foreign Application Priority Data

Mar. 24, 1994 [JP] Japan ................ 6-053694

[51] Int. Cl.$^6$ .................. G06K 9/34; H04N 1/419
[52] U.S. Cl. .............. 382/176; 382/235; 358/261.1; 358/462
[58] Field of Search ............... 358/456, 462, 358/261.1, 429, 467, 470, 298; 382/176, 192, 194, 237, 235, 245, 175; H04N 1/419; G06K 9/34

[56] References Cited

U.S. PATENT DOCUMENTS

| | | | |
|---|---|---|---|
| 4,504,972 | 3/1985 | Scherl et al. | 382/51 |
| 4,547,811 | 10/1985 | Ochi et al. | 358/280 |
| 4,682,215 | 7/1987 | Adachi | 358/500 |
| 4,879,753 | 11/1989 | El-Sherbini | 382/50 |
| 5,016,118 | 5/1991 | Nannichi | 358/462 |
| 5,048,096 | 9/1991 | Beato | 382/9 |
| 5,335,290 | 8/1994 | Cullen et al. | 382/9 |
| 5,465,304 | 11/1995 | Cullen et al. | 382/176 |

*Primary Examiner*—Edward L. Coles, Sr.
*Assistant Examiner*—Madeleine A-V Nguyen
*Attorney, Agent, or Firm*—Limbach & Limbach L.L.P.

[57] ABSTRACT

A run length which is the length of a run representing continuous black pixels is calculated on the basis of binary image data, and an extending process is performed for the run using a target pixel as an object to generate an extended run. An extended run length representing the length of the extended run and a maximum run length representing the length of the longest run in the range of the extended run are calculated. If a difference between the extended run length and the maximum run length is smaller than a predetermined value, an image near the target pixel is determined as a character image. If the difference is equal to or larger than the predetermined value, the image is determined as a half-tone image. In this manner, accuracy in separation between the half-tone area and the character area in a document image can be improved.

12 Claims, 10 Drawing Sheets

HALF-TONE
(BINARIZED)

FIG. 10A

HALF-TONE
(EXTENDED)

FIG. 10B

CHARACTER
(BINARIZED)

FIG. 10C

CHARACTER
(EXTENDED)

IMAGE PROCESSING APPARATUS

BACKGROUND OF THE INVENTION

1. Field of the Invention

The present invention relates to an image processing apparatus in which a character area, a photograph area, and a half-tone area in a document image serving as an object are separated from each other as image areas, characters can be processed with a high resolution, and photographs and half-tones can be processed with good gradation.

2. Description of the Related Art

In general, in a document image processing apparatus which can process not only code information but also image information, for an original read by a reading means such as a scanner, image information such as a character or line drawing having a contrast is simply binarized using a fixed threshold, and image information such as a photograph having gradation is binarized by a pseudo gradation means using an error diffusion method or the like. When read image information is simply binarized using the fixed threshold, image quality is not degraded in a character area or a line image area because the resolutions in these areas can be maintained. However, an image having degraded image quality is obtained in a photographic image area because gradation in this area is not maintained. On the other hand, when a gradation process is performed for the read image information by an error diffusion method or the like, image quality in the photographic image area is not degraded because gradation in the area is maintained, but image quality in each of the character area and line image area is degraded because the resolutions of these areas are decreased. More specifically, when a single binarizing process is simply performed for the read image information, images each having satisfactory image quality cannot be simultaneously obtained in the areas having different features.

Therefore, in order to binarize a document image, in which characters and photographs are mixed, so as to simultaneously satisfy a high resolution of the characters and good gradation of the photographs, a character area, a photograph area, and a half-tone area are separated from each other in the document image. Binarizing processes suitable for the respective areas are performed, or spatial filter processes suitable for the respective areas (for example, a high-pass filter for the character area, no filter for the photograph area, and a low-pass filter for the half-tone area) are performed, and a binarizing process must be performed by a specific pseudo gradation means.

In order to cope with the above problem, as a method of separating three areas, i.e., the character, photograph, and half-tone areas from each other, a BSET method (Block Separate Transformation method) is proposed in "Method of Identifying and Processing Half-tone Photograph" (Transactions of The Institute of Electronics and Communication Information Engineers of Japan '87/2, Vol. J70-B, No. 2). This method is a method in which an image as an object is divided into blocks, and three areas are separated from each other in accordance with changes in density in the blocks. In this case, the following natures of the changes in density are used.

(a) In a photograph area, a change in density in a block is small.

(b) In a character or half-tone area, a change in density in a block is large.

(c) In a character area, the cycle of a change in density is large.

(d) In a half-tone area, the cycle of a change in density is small. A description of the natures will be described below.

(1) An image as an object is divided into blocks each constituted by (m×n) pixels.

(2) A maximum density signal Dmax and a minimum density signal Dmin in each block are calculated, and a maximum density difference signal ΔDmax in the block is calculated.

(3) A predetermined threshold Th1 is compared with the signal ΔDmax, and a photograph area is separated from non-photograph areas (character/half-tone areas) under the following conditions:

ΔDmax≦Th1 . . . photograph area

ΔDmax>Th1 . . . non-photograph area (4) Pixels in each block are binarized (0/1) in accordance with an average signal Da of signals in the block.

(5) The number Kh of times of 0/1 change in pixels continuously arranged in the block in the main scanning direction is calculated. Similarly, the number Kv of times of change in pixels arranged in a sub-scanning direction is calculated.

(6) A predetermined threshold Th2 is compared with Kh and Kv, and a character area is separated from a half-tone area under the following conditions:

Kh≧Th2 and Kv≧Th2 . . . half-tone area

Kh<Th2 or Kv<Th2 . . . character area

With the above procedure, the character, photograph, and half-tone areas can be separated from each other, and binarizing processes can be appropriately performed for the respective areas.

In image separation schemes including the image separation scheme described above, the following problems are generally posed.

(1) Half-tone images have many numbers of lines ranging from 65 to 200 (lines/inch). The prior art is effectively used for a half-tone image having a large number of lines. However, according to the prior art, a half-tone image having a small number of lines cannot be separated from a character image because the feature of the half-tone image is considerably similar to that of the character image.

(2) Since a block size required for separation increases as the number of lines of a half-tone image as an object decreases, a load on hardware increases. In addition, since a memory such as a line memory is required, the arrangement of the hardware becomes complex.

SUMMARY OF THE INVENTION

It is an object of the present invention to provide an image processing apparatus in which accuracy in separation between character, half-tone, and photograph areas is improved to reduce a load on hardware.

In order to achieve the object, according to the present invention, there is provided an image processing apparatus for determining an image type of each area in an image, comprising: binarizing means for binarizing an input image signal to provide binary image data consisting of first and second values; run length calculating means for calculating, on the basis of the binary image data provided by the binarizing means, a length of a run representing a continuation of the binary image data having the first value; run extension means for replacing a pixel having the second value and with a pixel having the first value with respect to the binary image data provided by the binarizing means to extend the run, thereby providing an extended run; maximum run length calculating means for calculating a maximum run length of run lengths calculated by the run length calculating means within a range of the extended run provided from the run length extending means; extended run length calculating means for calculating a length of the extended run provided from the run extension means; and determining means for determining an image type of the input image signal on the basis of the extended run length calculated by the extended run length calculating means and the maximum run length calculated by the maximum run length calculating means.

In this case, the run length is a length of white or black pixels continuously arranged in a main scanning direction in a binary image, i.e., a length of a continuation of pixels having the same color.

According to the present invention, an input image signal read by an input device such as a scanner is binarized, and the run length of an image is calculated on the basis of the binary image signal. In addition, an extending process for pixels (run of black pixels) is performed on the basis of the binary image signal. The maximum value of the run length of the input image in the range of the extended run of the black pixels is calculated. The run length of the extended run is calculated, and the type of input image is determined on the basis of the difference between the run length of the extended run and the maximum run length.

when the type of image is determined on the basis of the extended run and the run having the maximum length within the range of the extended run, the type of image can be correctly determined. More specifically, the run lengths of pixels (black pixels), of images of different types, each having a target value used before and after an extending process for an input image are considerably different from each other. For this reason, when the run lengths obtained before and after the extending process are compared with each other, the types of images (for example, a half-tone image or a character image) can be correctly determined. In addition, since the types of images are determined in units of extended runs, an erroneous determination process caused by noise or the like can be suppressed compared with a case wherein the types of images are determined in units of pixels as in the conventional technique.

According to the present invention, a type of input image is determined on the basis of a ratio (run ratio) of the run length of an extended run to the maximum run length. In this manner, the types of image can be correctly determined.

According to the present invention, a maximum density difference signal representing the density difference between a pixel having the maximum density and a pixel having the minimum density in an area including a target pixel and having a predetermined size is calculated on the basis of an input image signal. The type of image of the input image signal is determined on the basis of the maximum density difference signal. The type of image of the input image signal is totally determined on the basis of a first determining process based on the maximum density difference and a second determining process based on a change in run length before and after the extending process. In this manner, the determining processes can be performed more correctly.

According to the present invention, pixels are thinned from an input signal, and the above image area determining process can be performed on the basis of the thinned image signal. For this reason, a necessary memory capacity can be reduced. As a result, the cost of manufacturing an apparatus is reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
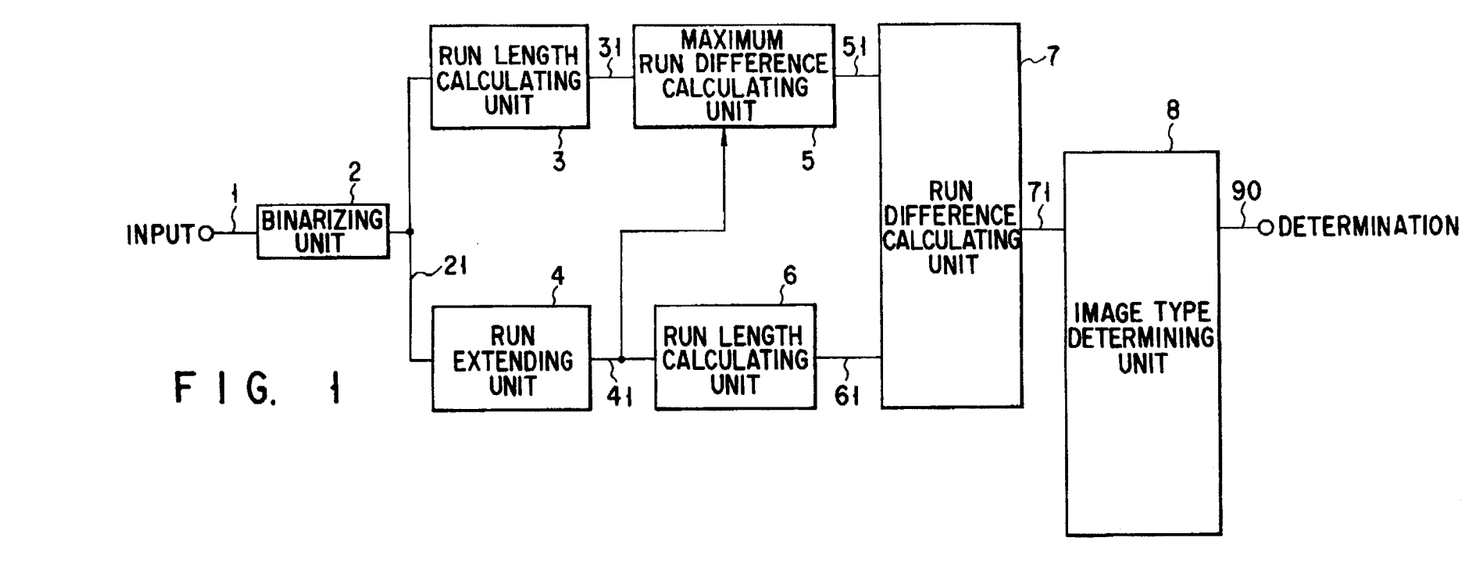
FIG. 1 is a block diagram showing the schematic arrangement of an image processing apparatus according to the first embodiment of the present invention.

The first embodiment of the present invention will be described below with reference to the accompanying drawings. FIG. 1 is a schematic view showing the arrangement of an image processing apparatus according to the first embodiment of the present invention. Referring to FIG. 1, reference numeral 1 denotes an input image signal; 2, a binarizing unit for binarizing an input signal; 21, a binary image signal; 3, a run length calculating unit; 31, a run length signal; 4, a run extension unit; 41, an extended run signal; 5, a maximum run length calculating unit; 51, a maximum run length signal; 6, a run length calculating unit; 61, a run length signal; 7, a run difference calculating unit; 71, a run difference signal; 8, an image type determining unit; and 90, a determination signal.

The input image signal 1 read by an input device such as a scanner (not shown) is compared with a binarizing threshold Th1 and binarized in the binarizing unit 2, and the binary image signal is output as the binary image signal 21 (white pixel: "0", black pixel: "1"). The run length calculating unit 3 connected to the binarizing unit 2 calculates the run length signal 31 of an input image on the basis of the binary image signal 21. The run extension unit 4 connected to the binarizing unit 2 performs an extending process for black pixels on the basis of the binary image signal 21 to output the extended run signal 41. The maximum run length calculating unit 5 connected to the run length calculating unit 3 and the run extension unit 4 calculates the maximum value of the run length signal 31 in the range in which the extended run signal 41 represents black pixels, and the maximum run length calculating unit 5 outputs the maximum run length signal 51.

The run length calculating unit 6 connected to the run extension unit 4 calculates the run length signal 61 of the extended run from the extended run signal 41. The run difference calculating unit 7 connected to the maximum run length calculating unit 5 and the run length calculating unit 6 calculates a difference between the maximum run length signal 51 and the run length signal 61 to output the run difference signal 71. The image type determining unit 8 connected to the run difference calculating unit 7 compares the run difference signal 71 with a threshold (not shown) to determine the type of image, thereby outputting the determination signal 90 representing the determination result.

The operation of the image processing apparatus according to this embodiment will be described below in detail. In the image processing apparatus according to this embodiment, a general document original is read by a reading device such as an image scanner, the read data is input as digital data having, e.g., eight bits per pixel, and the image type of this original is determined and output.

Referring to FIG. 1, the input image signal 1 (f) serving as an input image signal is compared with the predetermined threshold Th1 and binarized in the binarizing unit 2, and the binary image signal is output as the binary image signal 21 (g). The binarizing unit 2 is constituted by a threshold memory (not shown) for storing the binarizing threshold Th1 and a comparator for comparing the input image signal 1 (f) with the threshold Th1. If the input image signal 1 is smaller than the threshold Th1, the binarizing unit 2 outputs "0" as the binary image signal 21 (g). If the input image signal 1 is larger than the threshold Th1, the binarizing unit 2 outputs "1". Conditional expressions (1) used in this comparing process are defined below:

$$g=0 : f<Th1$$
$$g=1 : f \geq Th1 \qquad (1)$$

Figure 2:
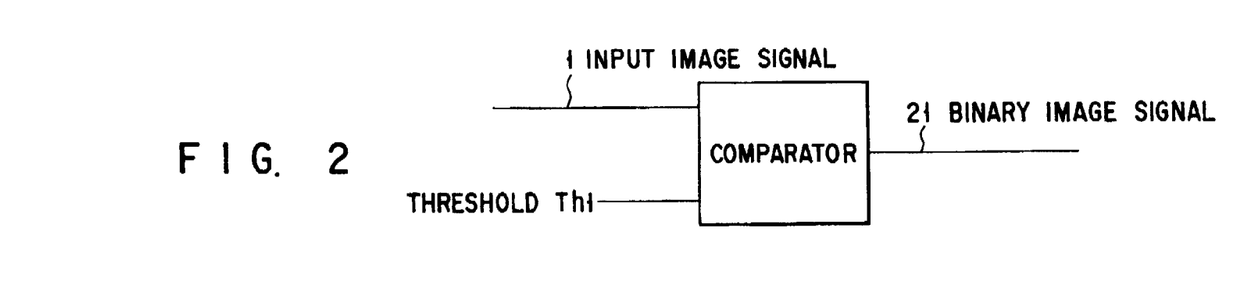
FIG. 2 is a block diagram showing a circuit arrangement of a binarizing unit 2 in FIG. 1.

FIG. 2 shows the arrangement of the binarizing unit 2 constituted by an 8-bit comparator 200. The binarizing unit 2 compares the 8-bit input image signal 1 with the predetermined 8-bit threshold Th1 to output the binary image signal 21 in accordance with the conditions defined by expressions (1).

Figure 3A:
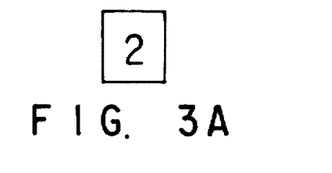
FIGS. 3A to 3C are views for explaining a run length calculating process in a run length calculating unit 3 in FIG. 1.
Figure 3B:
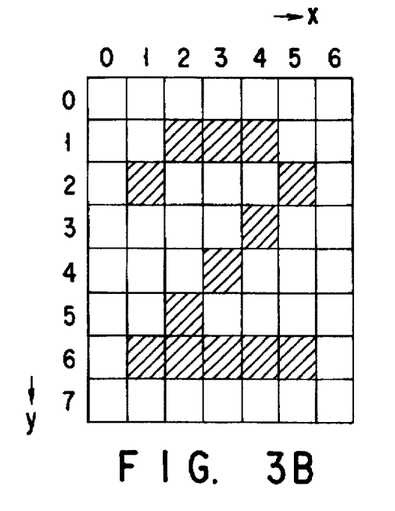
Figure 3C:
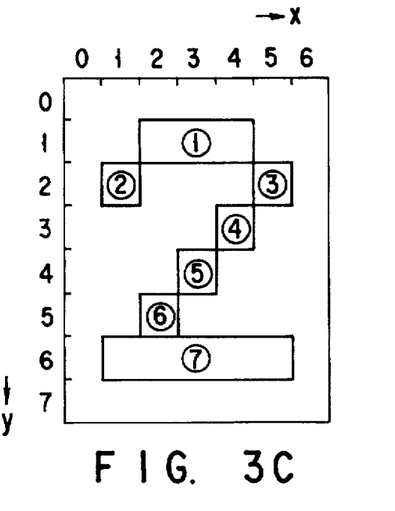

In the run length calculating unit 3, a run length is calculated from the binary image signal 21. FIGS. 3A to 3C are views for explaining a run length calculating method used in the run length calculating unit 3. The run length calculating method will be described below in detail with reference to FIGS. 3A to 3C. FIG. 3A shows an original image. FIG. 3B is a view obtained by expressing the original image of FIG. 3A by bit mapping. Referring to FIG. 3B, each box corresponds to a pixel, hatched portions represent black (1) pixels, and remaining portions represent white (0) pixels. Referring to FIG. 3B, the first black pixel is located at the coordinates (2,1) and connected to black pixels arranged up to the coordinates (4,1) in the right direction (main scanning direction). In addition, the pixel (black pixel) at the coordinates (1,6) is connected to black pixels arranged up to the coordinates (5,6). The connected states of the pixels described above are replaced with pieces of information (runs) each obtained by grouping connected pixels in the right direction, as shown in FIG. 3C. These runs are output as pieces of information of run lengths. For example, (when one pixel is used as a unit length), the first run has a length of 3, and the second run has a length of 1. As described above, in the run length calculating unit 3, a run length is calculated from the binary image signal 21, and the calculated run length is output as the run length signal 31.

Figure 4:
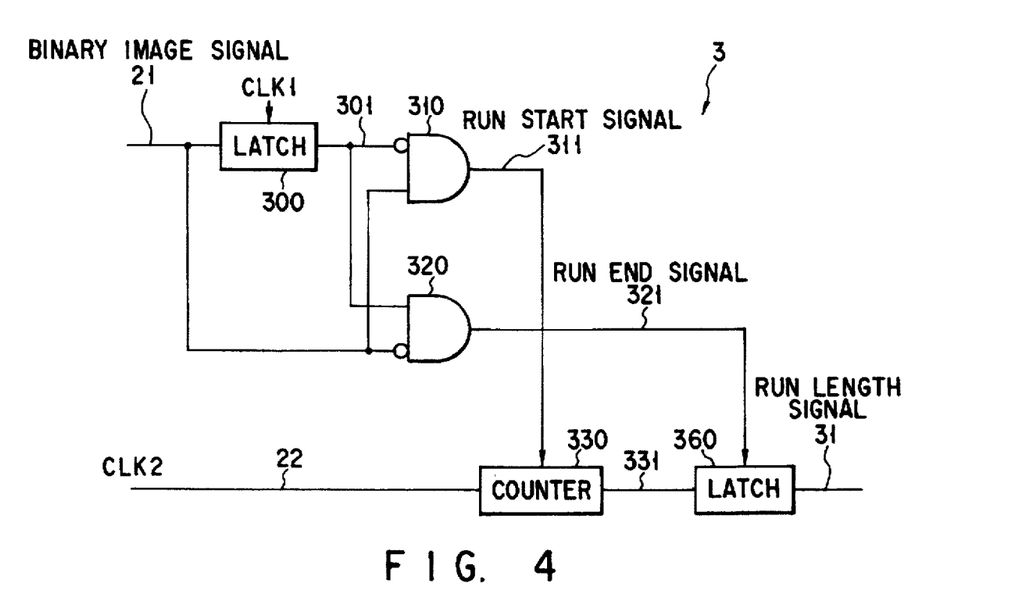
FIG. 4 is a diagram showing a circuit arrangement of the run length calculating unit 3 in FIG. 1.

FIG. 4 shows the arrangement of the run length calculating unit 3. In the run length calculating unit 3, the first pixel is stored in a latch 300 by the binary image signal 21 in response to a first image clock CLK1. In this case, the frequency of the image clock is equal to the maximum image signal frequency. Subsequently, if the first pixel is white, and the next pixel is black, an AND gate 310 outputs "1" in response to a second image clock CLK2. Otherwise, the AND gate 310 outputs "0". More specifically, an output (run start signal) 311 from the AND gate 310 is a signal representing the start of a black run. On the other hand, if the first pixel is black, and the next pixel is white, the AND gate 320 outputs "1". Otherwise, the AND gate 320 outputs "0". More specifically, an output (run end signal) 321 from the AND gate 320 is a signal representing the end of a black run.

A counter 330 is reset by the run start signal 311, and performs a counting operation in response to the second image clock CLK2. An output signal 331 from the counter 330 is stored in a latch 360 in response to the run end signal 321. More specifically, a run length is stored in the latch 360. The run length stored in the latch 360 is output as the run length signal 31.

Simultaneously with the run length calculating process in the run length calculating unit 3 in FIG. 1, an extending process (run extension process) of an image is performed in the run extension unit 4 on the basis of the binary image signal 21. In this case, the run extension process is a process in which, when a target pixel (black pixel) of an input image is used as an object, and a black pixel is located within a specific pixel range in the main scanning direction, all the pixels between the target pixel and the black pixel are replaced with black pixels.

Figure 5A:
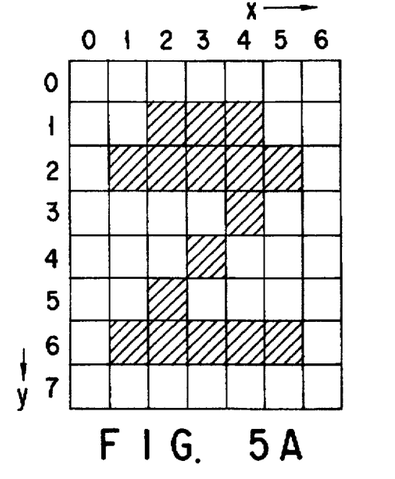
FIGS. 5A and 5B are views for explaining a run extension process in a run extension unit 4 in FIG. 1.
Figure 5B:
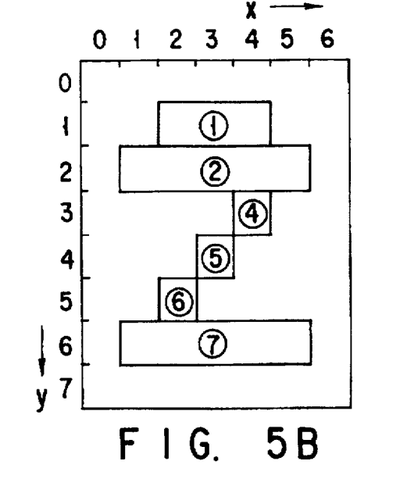

The method of a run extension process will be described below with reference to FIGS. 3A to 3C, 5A, and 5B. In this case, assume that a specific range (range to be extended) include four pixels. In consideration of a black pixel at the coordinates (1,2) in FIG. 3B, the fourth pixel (coordinates (5,2)) of the pixels arranged from the black pixel in the main scanning direction is a black pixel. Therefore, all the pixels arranged from the coordinates (1,2) to the coordinates (5,2) are replaced with black pixels and output. In consideration of a black pixel at the coordinates (2,1), black pixels are continuously arranged up to the coordinates (4,1), and no black pixel is located on the right of the coordinates (4,1). Therefore, the run extension unit 4 does not change these pixels and directly outputs the input signals. Other pixels in FIG. 3B are processed as described above. In this case, the run extension unit 4 directly outputs the input signals. The outputs obtained by the above process are shown in FIG. 5A.

Figure 6:
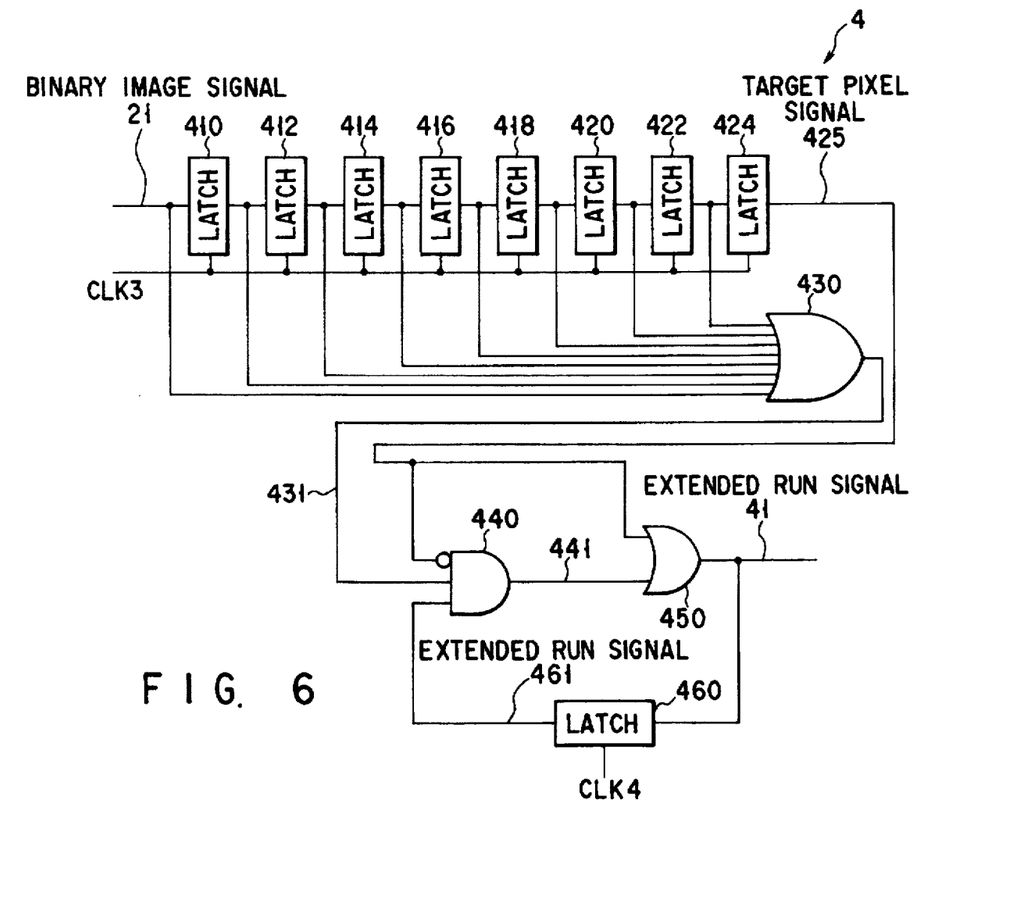
FIG. 6 is a diagram showing a circuit arrangement of the run extension unit 4 in FIG. 1.

FIG. 6 shows the circuit arrangement of the run extension unit 4. FIG. 6 shows a case in which an extended range is constituted by eight pixels. Referring to FIG. 6, reference numerals 410, 412, 414, 416, 418, 420, 422, and 424 denote latches. The pixels represented by the binary image signal 21 input to the run extension unit 4 are sequentially stored in the latches 410 to 424 from the first pixel in response to an image clock CLK3. In this case, it is assumed that an image signal 425 is the image signal of a target pixel. Therefore, a binary image signal representing pixels from a pixel next to the target pixel to the eighth pixel is input to an OR gate 430. If these pixels include at least one black pixel, the OR gate 430 outputs "1" as the conditional signal 431; if all the pixels are white pixels, the OR gate 430 outputs "0" as the conditional signal 431. That is, the conditional signal 431 is a signal which indicates whether a black pixel is located within the range of the pixel next to the target pixel to the eighth pixel. When the target pixel is a white pixel, an AND gate 440 checks whether the pixel is output as the black pixel of an extended run signal. A target pixel signal 425 (BIN), the conditional signal 431 (FLAG1), and an extended image signal 461 (EX0) of the first preceding pixel (to be described later) are input. The AND gate 440 checks "whether, when the target pixel is a white pixel, the pixel is output as the black signal of the extended run signal" in accordance with conditional expressions (2) for determination (to be described later), and the AND gate 440 outputs a conditional signal 441 (FLAG2) representing the determination result.

FLAG2=1 : BIN=0, FLAG1=1, and EX0=1

FLAG2=0 : except for the above conditions (or except for BIN=0, FLAG1=1, and EX0=1) (2)

An OR gate 450 outputs the extended run signal 41 (EX). The OR gate 450 outputs the extended run signal 41 on the basis of the target image signal 425 (BIN) and the conditional signal 441 (FLAG2) under the determination conditions defined by conditional expressions (3):

EX=1 : BIN=1 or FLAG2=1

EX=0 : BIN=0 and FLAG2=0 (3)

The above extended run signal 461 of the first preceding pixel is an image signal obtained such that the extended run signal 41 obtained by the above procedure is delayed by one pixel in response to an image clock CLK4 by means of a latch 460.

Figure 7:
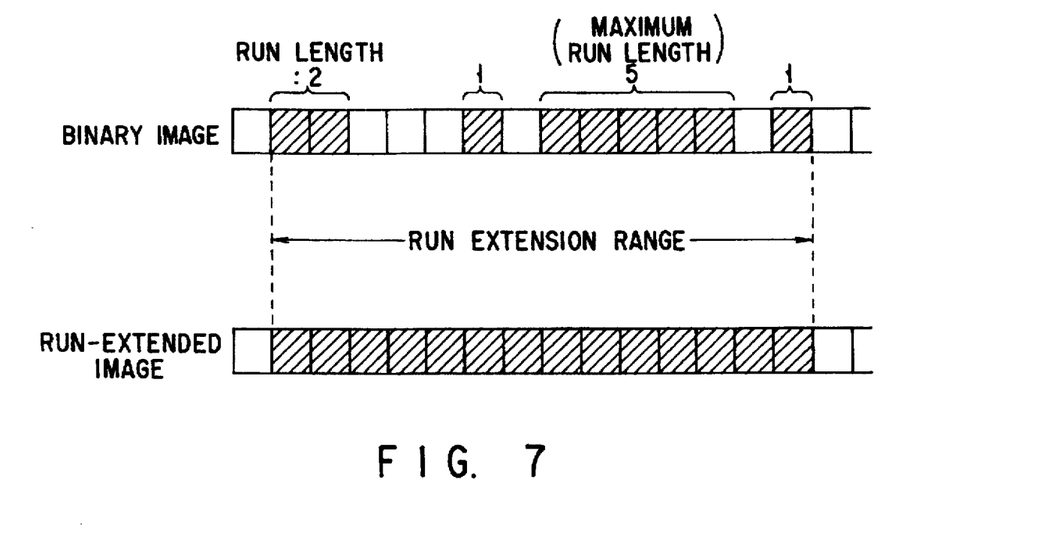
FIG. 7 is a view for explaining a maximum run length calculating process in a maximum run length calculating unit 5 in FIG. 1.

The maximum run length calculating unit 5 outputs a signal having the maximum run of the run length signal 31 output from the run length calculating unit 3 in a range in which the output (extended run signal) 41 from the run extension unit 4 is set to be "1", i.e., a range in which the extended binary image signal represents black pixels. The contents of the above process will be described below with reference to FIG. 7. FIG. 7 shows a binary image and its run-extended image in a specific line of a certain image. Referring to FIG. 7, each hatched portion indicates a black pixel, and each non-hatched portion indicates a white pixel. In this example, the run lengths of the binary image are "2", "1", "5", and "1" in an order named, and the maximum run length of the binary image is "5" in a run extension range (i.e., a range in which the run-extended image represents black pixels). Therefore, the maximum run length calculating unit 5 outputs "5" as the maximum run length signal 51.

Figure 8:
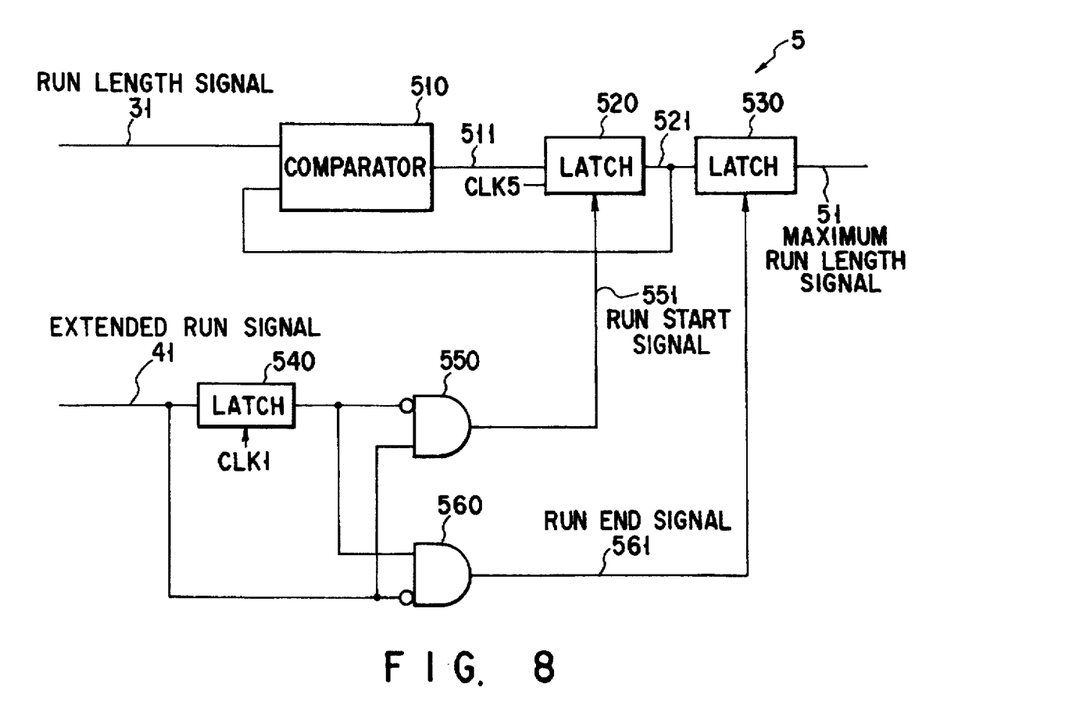
FIG. 8 is a diagram showing a circuit arrangement of the maximum run length calculating unit 5 in FIG. 1.

FIG. 8 shows a circuit arrangement of the maximum run length calculating unit 5. A process in the maximum run length calculating unit 5 will be described below with reference to FIG. 8. The run length signal 31 and the extended run signal 41 are input to the maximum run length calculating unit 5. At this time, a comparator 510 in the maximum run length calculating unit 5 compares the run length signal 31 with a maximum run signal 521 stored by a process (to be described later). As a result of this comparison, a signal having a larger magnitude is output. A signal 511 output from the comparator 510 is stored in the latch 520 in response to an image clock CLK5. In this case, the latch 520 is cleared to be "0" in response to a signal 551 (to be described later) in advance. The signal 521 stored in the latch 520 is stored in a latch 530 in response to a signal 561 (to be described later) and output as the maximum run length signal 51.

The first pixel of the extended run signal 41 is stored in a latch 540 in response to the first image clock CLK1. Subsequently, if the first pixel is a white pixel, and the second pixel is a black pixel, an AND gate 550 outputs "1". Otherwise, the AND gate 550 outputs "0". That is, an output (run start signal) 551 from the AND gate 550 is a signal representing the start of a black run. On the other hand, if the first pixel is a black pixel, and the second pixel is a white pixel, an AND gate 560 outputs "1". Otherwise, the AND gate 560 outputs "0". That is, an output (run end signal) 561 from the AND gate 560 is a signal representing the end of a black run. More specifically, the latch 520 is cleared to be "0" in response to the black run start signal 551. In addition, this means that the maximum run signal 521 is stored in the latch 530 in response to the black run end signal 561.

The run length of an extended run is calculated by the run length calculating unit 6. A process performed in this calculating unit 6 is the same as that described above except for the run length calculating unit 3 and the input signal. The run length calculating unit 6 outputs the run length signal 61 of the calculated extended run.

The run difference calculating unit 7 calculates a difference between the maximum run length signal 51 (BR) and the run length signal 61 (ER) of the extended run, which signals are calculated in the above process. The run difference signal 71 (DF) is calculated by expression (4):

DF=ER−BR (4)

Figures 9, 10A, 10B:
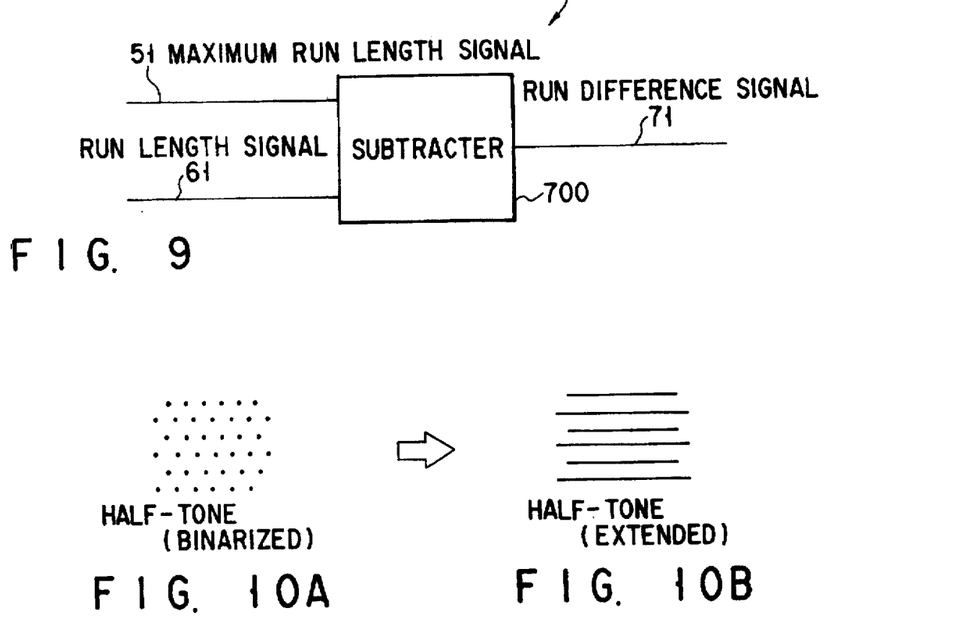
FIG. 9 is a block diagram showing a circuit arrangement of a run difference calculating unit 7 in FIG. 9.
FIGS. 10A to 10D are views for explaining an algorithm for determining types of images in an image type determining unit 8 in FIG. 1.
Figure 10C:
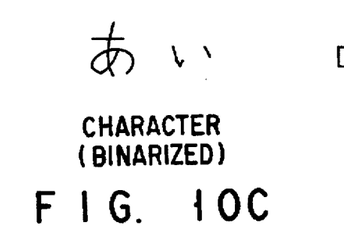
Figure 10D:
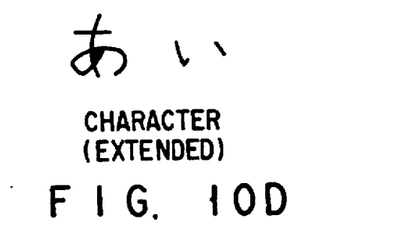

FIG. 9 shows the circuit arrangement of the run difference calculating unit 7. As shown in FIG. 9, the run difference calculating unit 7 is constituted by a subtracter 700. In the run difference calculating unit 7, a subtracting process between the maximum run length signal 51 and the run length signal 61 of the extended run is performed, and the process result is output as the run difference signal 71.

In the image type determining unit 8, the type of image is determined on the basis of the run difference signal 71. The image type determining unit 8 compares the run difference signal 71 (DF) with a predetermined threshold Th2, determines the type of image on the basis of the comparison result and determination expressions (5), and outputs the determination signal 90 (DSC) representing the determination result.

$$DSC=1 \text{ (character): } DF<Th2$$
$$DSC=0 \text{ (half-tone): } DF \geq Th2 \qquad (5)$$

The principle of this determination will be described below.

FIGS. 10A to 10D show the principle of the determination. FIGS. 10A and 10B show binarized and extended images of a half-tone image. As is apparent from FIG. 10A, in the half-tone image, dots considerably smaller than characters are arranged at predetermined cycles. Therefore, when the half-tone image is extended, the pixels are largely extended as shown in FIG. 10B. That is, the run length largely changes before and after extension. On the other hand, in the character image shown in FIGS. 10C and 10D, the run length does not largely change before and after extension. This determination algorithm is used to compare the run length of a non-extended binary image with the run length of an extended binary image to check whether the binary image is a character image or a halftone image. When the run length largely changes, the binary image is determined as [half-tone]; when the run length slightly changes, the binary image is determined as [character].

Figure 11:
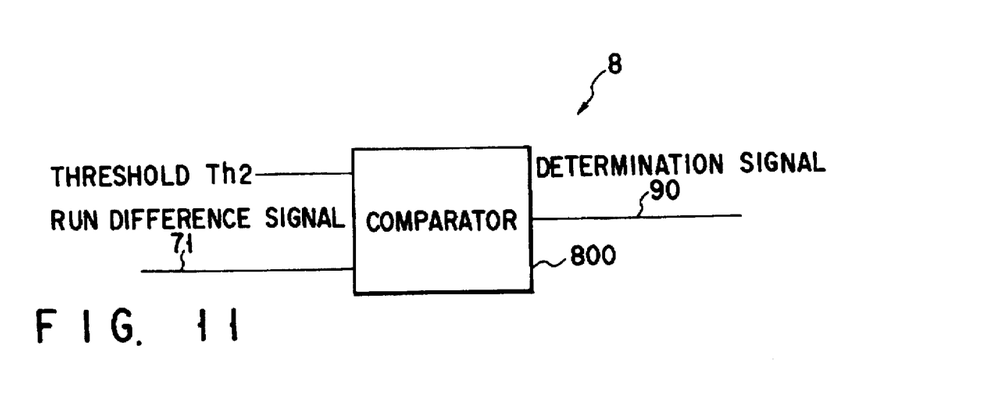
FIG. 11 is a block diagram showing a circuit arrangement of the image type determining unit 8 in FIG. 1.

FIG. 11 shows a circuit arrangement of the image type determining unit 8. The image type determining unit 8 is constituted by a comparator 800 as shown in FIG. 11. The image type determining unit 8 compares the input run difference signal 71 (DF) with the predetermined threshold Th2, determines the type of image on the basis of the comparison result and determination conditions (5), and outputs the determination signal 90 (DSC) representing the determination result.

Figure 12:
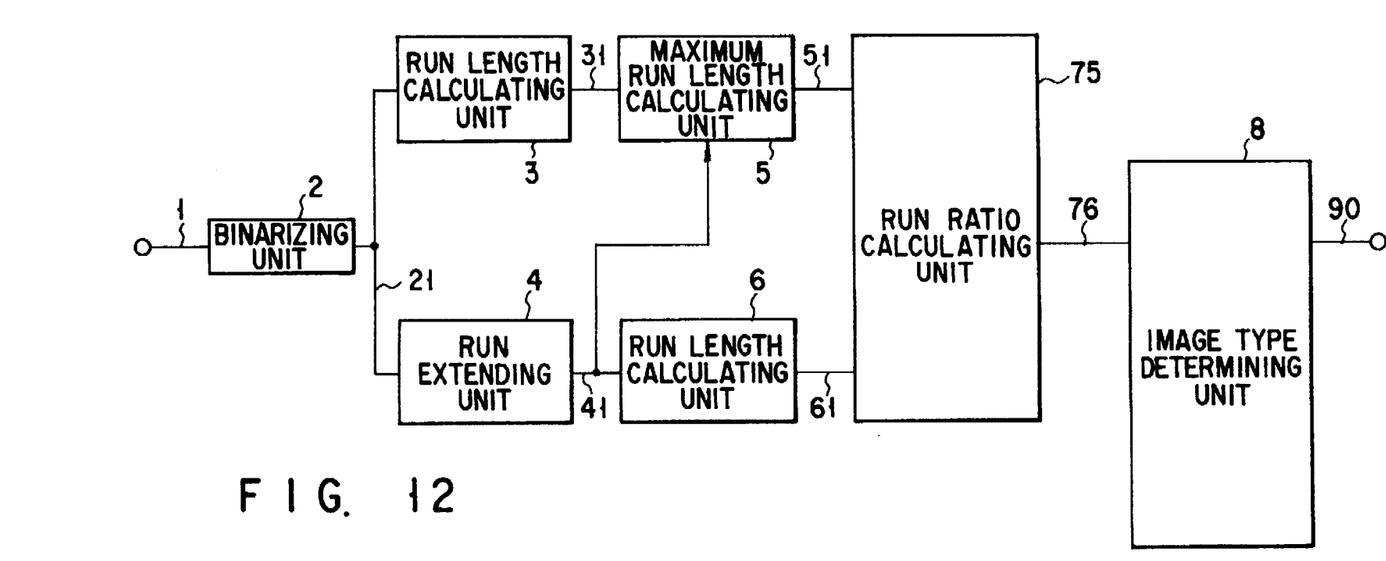
FIG. 12 is a block diagram showing the arrangement of an image processing apparatus according to the second embodiment of the present invention.

The second embodiment of the present invention will be described below. FIG. 12 is a schematic view showing the arrangement of an image processing apparatus according to the second embodiment of the present invention. Referring to FIG. 12, reference numeral 1 denotes an input image signal; 2, a binarizing unit for binarizing an input signal; 21, a binary image signal; 3, a run length calculating unit; 31, a run length signal; 4, a run extension unit; 41, an extended run signal; 5, a maximum run length calculating unit; 51, a maximum run length signal; 6, a run length calculating unit; 61, a run length signal; 75, a run ratio calculating unit; 76, a run ratio signal; 8, an image type determining unit; and 90, a determination signal.

In this embodiment, the input image signal 1, the binarizing unit 2, the run length calculating unit 3, the run extension unit 4, the maximum run length calculating unit 5, the run length calculating unit 6, and the image type determining unit 8 are the same as those of the first embodiment in FIG. 1, and a detailed description thereof will be omitted. Therefore, only different parts will be described below.

The run ratio calculating unit 75 calculates a run ratio which is a ratio of the maximum run length to the run length of an extended run on the basis of the maximum run length signal 51 (BR) obtained by the maximum run length calculating unit 5 and the run length signal 61 (ER) obtained by the run length calculating unit 6 for the extended run. The run ratio signal 76 (RA) representing the run ratio is calculated by the following expression:

$$RA=BR/ER \qquad (6)$$

Figure 13:
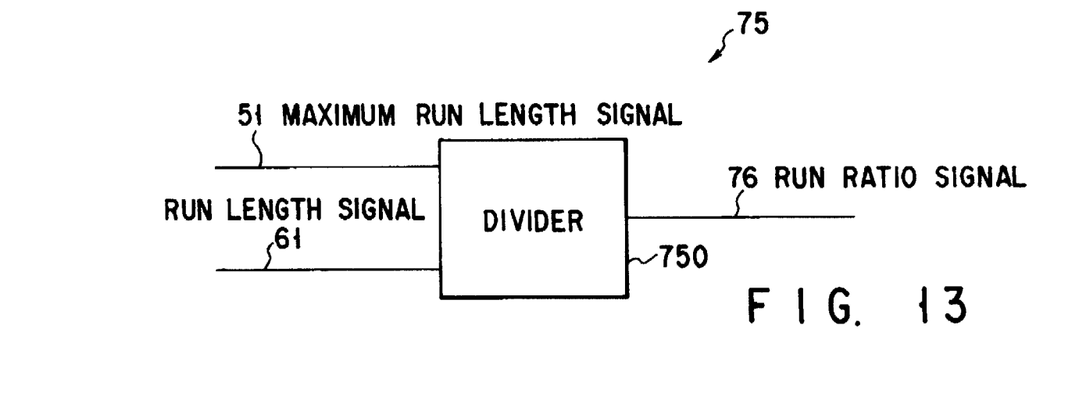
FIG. 13 is a block diagram showing a circuit arrangement of a run ratio calculating unit 75 in FIG. 12.

FIG. 13 shows the circuit arrangement of the run ratio calculating unit 75. As shown in FIG. 13, the run ratio calculating unit 75 is constituted by a divider 750. The run ratio calculating unit 75 performs a dividing process between the maximum run length signal 51 and the run length signal 61, and outputs the process result as the run ratio signal 76. The image type determining unit 8 in FIG. 12 determines a type of image by conditional expressions (5) on the basis of the run ratio signal 76.

In each of the above embodiments (first and second embodiments), a type of image is determined on the basis of the length of an extended run. When the type of image is determined on the basis of the extended run as described above, an erroneous determining process caused by noise or the like can be effectively suppressed compared with a case wherein the types of images are determined in units of pixels.

Although each embodiment in which a character image and a half-tone image are identified and separated from each other has been described above, the third embodiment of the present invention in which an image including characters, half-tones, and photographs is to be processed will be described below.

Figure 14:
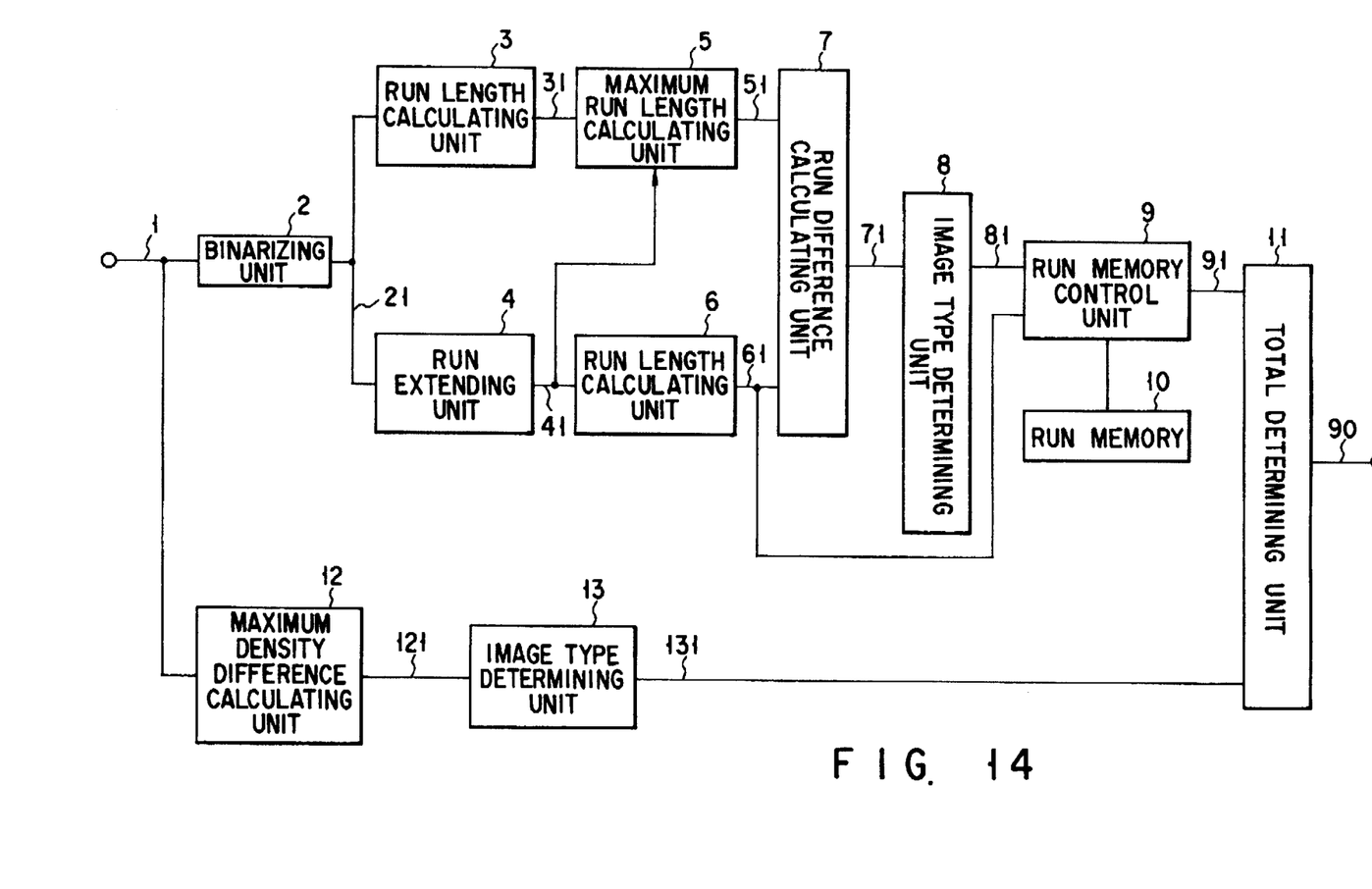
FIG. 14 is a block diagram showing the arrangement of an image processing apparatus according to the third embodiment of the present invention.

FIG. 14 is a schematic view showing the arrangement of an image processing apparatus, according to this embodiment in which an image including characters, half-tones, and photographs is to be processed. Referring to FIG. 14, reference numeral 1 denotes an input image signal; 2, a binarizing unit for binarizing an input signal; 21, a binary image signal; 3, a run length calculating unit; 31, a run length signal; 4, a run extension unit; 41, an extended run signal; 5, a maximum run length calculating unit; 51, a maximum run length signal; 6, a run length calculating unit; 61, a run length signal; 7, a run difference calculating unit; 71, a run difference signal; 8, a first image type determining unit; 81, a first image determination signal; 9, a run memory control unit; 10, a run memory; 11, a total determining unit; 12, a maximum density difference calculating unit; 13, a second image type determining unit; 131, a second image determination signal; and 90, a determination signal.

In this embodiment, since the input image signal 1, the binarizing unit 2, the run length calculating unit 3, the run extension unit 4, the maximum run length calculating unit 5, the run length calculating unit 6, the run difference calculating unit 7, and the first image type determining unit 8 are the same as those of the first embodiment in FIG. 1, a description thereof will be omitted, and only different parts will be described below.

The run memory control unit 9 connected to the image type determining unit 8 and, the run length calculating unit 6, and the run memory 10 controls to write/read the first image determination signal 81 and the run length signal 61 in/from the run memory 10.

The maximum density difference calculating unit 12 calculates a maximum density difference signal 121 of an image density in a local area of an input image signal. The second image type determining unit 13 connected to the maximum density difference calculating unit 12 determines the type of image on the basis of the maximum density difference signal 121 and outputs the second image determination signal 131 representing the determination result. The total determining unit 11 connected to the run memory control unit 9 and the image type determining unit 13 totally determines the type of image on the basis of the first image determination signal 81 and the second image determination signal 131 and outputs the determination signal 90 representing the determination result.

The operation of this embodiment will be described below in detail. The run memory control unit 9 sequentially writes, in the run memory 10, the run length signal 61 output from the run length calculating unit 6, the determination signal 81 thereof, and a run type signal (not shown) (a signal representing whether a run is black or white).

Figure 15:
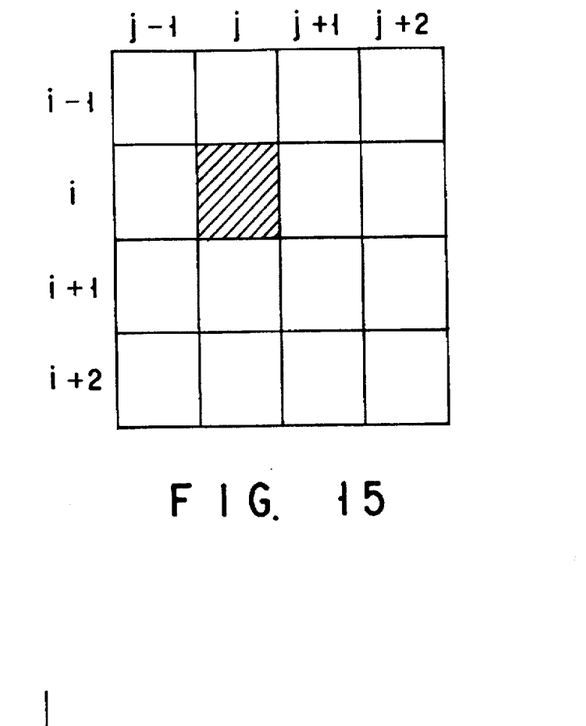
FIG. 15 is a view showing a reference window range when a maximum density difference is calculated in a maximum density calculating unit 12 in FIG. 14.

On the basis of an image signal as an object to be processed, the maximum density difference calculating unit 12 calculates a maximum density signal Dmax and a minimum density signal Dmin in a (4×4) area including a target pixel indicated by a hatched portion in FIG. 15. A maximum density difference signal ΔDmax in the (4×4) area is calculated by expression (7):

$$\Delta Dmax = Dmax - Dmin \tag{7}$$

The second image type determining unit 13, as represented by expressions (8), compares the signal ΔDmax with a predetermined threshold Th3, determines a photograph area and a character/half-tone area, and outputs the second image determination signal 131 (ID) representing the determination result.

$$\Delta Dmax < Th3 \ldots \text{photograph area} : ID=0$$

$$\Delta Dmax \geq Th3 \ldots \text{character/half-tone area} : ID=1 \tag{8}$$

Figure 16:
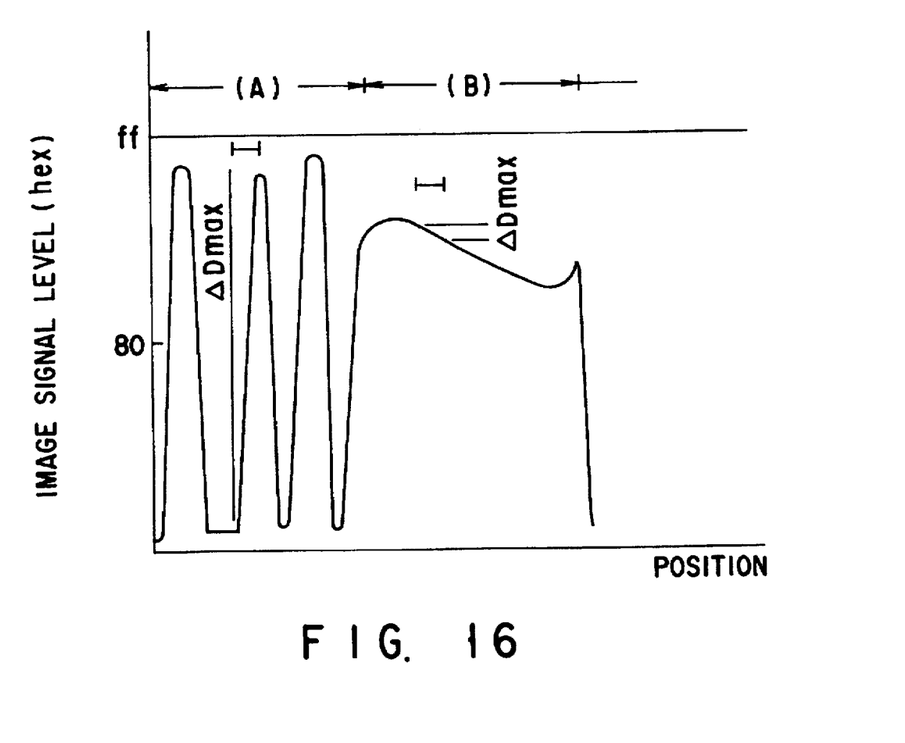
FIG. 16 is a graph for explaining the principle of determination of a type of image upon calculating a maximum density difference in the maximum density calculating unit 12 in FIG. 14.

The determination principle for the photograph area and the character/half-tone area will be described below. FIG. 16 is a graph showing changes in image signal levels of the photograph area and the character/half-tone area. A change in density in the character/half-tone area is indicated by (A) in FIG. 16, and the change in density in this area is abrupt. On the other hand, a change in density in the photograph area is indicated by (B) in FIG. 16, and the change in density in this area is relatively moderate. That is, a maximum density difference in a local area is large in the character/half-tone area but small in the photograph area. The determination for the photograph area and the character/half-tone area is performed on the basis of the principle described above.

Figure 17:
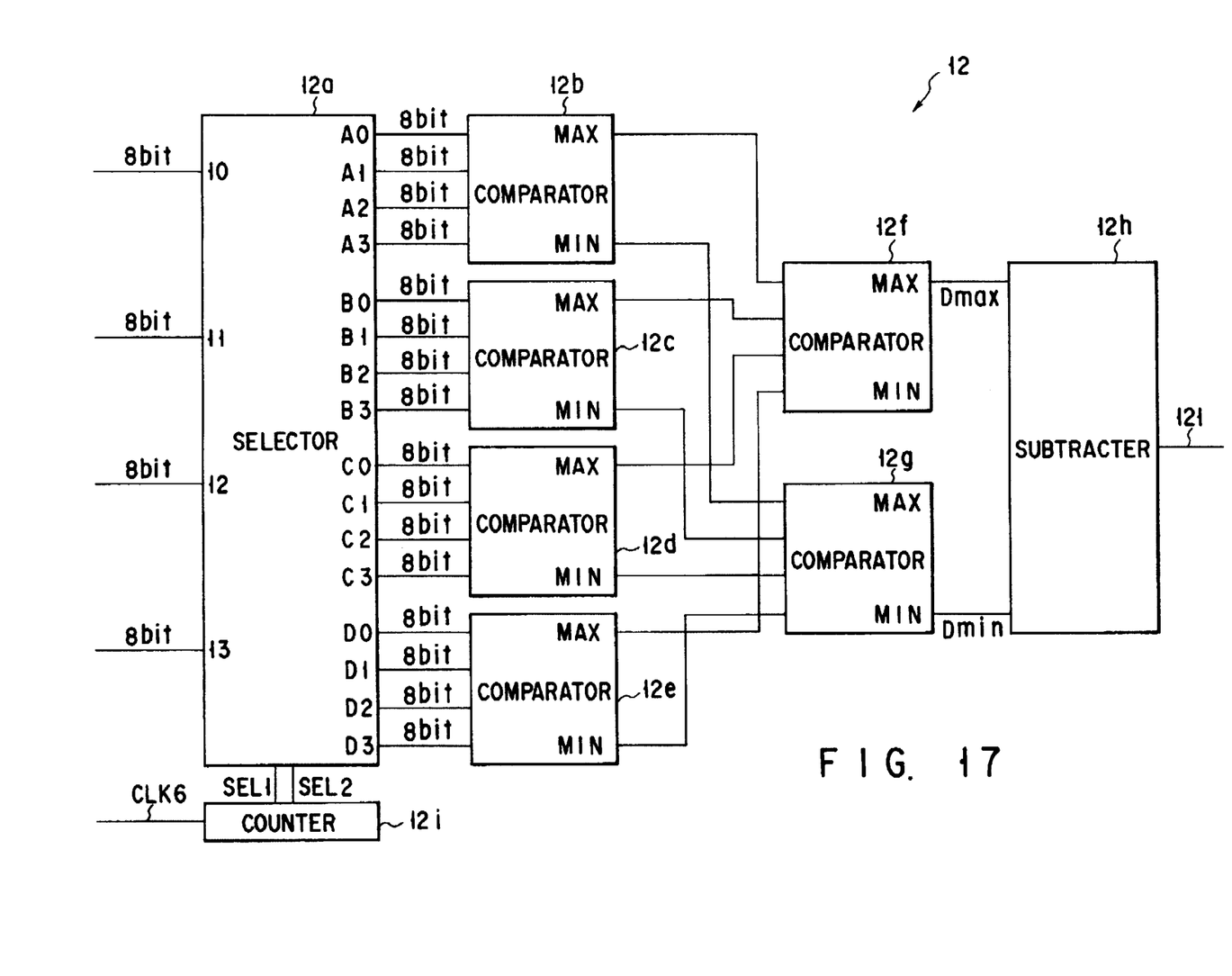
FIG. 17 is a block diagram showing a circuit arrangement of the maximum density calculating unit 12 in FIG. 14.

The arrangement of the maximum density difference calculating unit 12 will be described next. FIG. 17 shows a circuit arrangement of the maximum density difference calculating unit 12. The maximum density difference calculating unit 12, with respect to the pixels in an image as an object to be processed, as shown in FIG. 15, calculates the maximum and minimum values of a density in an area of (4×4) pixels including a target pixel (a pixel indicated by a hatched portion) and subtracts the minimum value from the maximum value to calculate the maximum density difference.

In the maximum density difference calculating unit 12, image information (eight bits/pixel) obtained such that the input image signal 1 is sequentially input in units of four pixels (four pixels vertically arranged in FIG. 15) in synchronism with a clock CLK6 in the main scanning direction is sequentially distributed to comparators 12b, 12c, 12d, and 12e through a selector 12a. Note that the image information input in units of four pixels is distributed by the selector 12a under the control using selection signals SEL1 and SEL2 from a 2-bit counter 12i operated by receiving the clock CLK6.

The image information is compared in units of 4×4 pixels by the comparators 12b to 12e, and the maximum density and minimum density of each array are calculated. Signals from the comparators 12b to 12e are input to comparators 12f and 12g in the next stage. The comparators 12f and 12g calculate the maximum value (Dmax) of the maximum values in each array and the minimum value (Dmin) of the minimum values in each array, respectively. With the above comparison process, the maximum value Dmax and minimum value Dmin of the density in the area of the 4×4 pixels shown in FIG. 15 are calculated and output. A subtracter 12h calculates a maximum density difference signal 121 which is a difference between the maximum value Dmax and minimum value Dmin of the density calculated as described above.

Referring back to the description with reference to FIG. 14, the second image type determining unit 13 is constituted by a comparator which is almost equivalent to the image type determining unit 8 shown in FIG. 10. The total determining unit 11 totally determines the type of input image on the basis of a first image determination signal 91 read out from the run memory 10 by the run memory control unit 9 and the second image determination signal 131 output from the second image type determining unit 13.

In this case, a reason why the first image determination signal 91 is stored in the run memory 10 will be briefly described below. Since the first determining process (in circuits except circuits 12 and 13 in FIG. 14) is performed on the basis of a binary run and an extended run, image determination results are output in units of runs. That is, the types of images are determined for the first time at the end positions of the runs. On the other hand, since the second image determining process (in circuits 12 and 13 in FIG. 14) is performed while a 4×4 window is moved pixel by pixel, the types of images are determined in units of pixel. Therefore, in order to synchronize the first image determining process with the second image determining process in the arrangement of the image processing apparatus of this embodiment, determining processes (first image determining process) in units of runs are performed for the first preceding line of the second image determining process, i.e., the first preceding line of a target pixel. The determination result is temporarily stored in the run memory 10, the total determining unit 11 must read out the first image determination signal from the run memory 10, and a process based on the first and second image determination signals must be performed. As a result, the image can be totally determined in units of pixels.

In the total determining unit 11, on the basis of the first image determination signal 91 (DSC) and the second image determination signal 131 (ID) which are input from the run memory 10, the total determination signal 90 (DIS) is output in accordance with expressions (9):

$$DIS=0 \ldots \text{photograph} : ID=0$$

$$DIS=1 \ldots \text{character} : ID=1 \text{ and } DSC=1$$

$$DIS=2 \ldots \text{half-tone} : ID=1 \text{ and } DSC=0 \tag{9}$$

Note that the total determining unit 11 can be constituted by a simple logic circuit or a memory (look-up table).

Note that the area of a reference range for extracting, e.g., a maximum density difference signal in the above embodiment, is not limited to (4×4) pixels, and the range may be appropriately, freely changed. In addition, in the maximum density difference calculating unit 12, the value ΔDmax can be replaced with feature amounts which respectively have different values in a character/half-tone portion and a photograph portion, e.g., (maximum density difference)/(average density), a Laplacian value which is the second-order differential value of an image, or the like.

The fourth embodiment of the present invention will be described below. Each of the embodiments (first to third embodiments) described above has a characteristic feature in which a type of image is determined using an extended run. The fourth embodiment has a thinning unit for thinning pixels. Therefore, it is the object of the fourth embodiment to reduce a memory capacity required for an image processing apparatus using an extended run.

Figure 18:
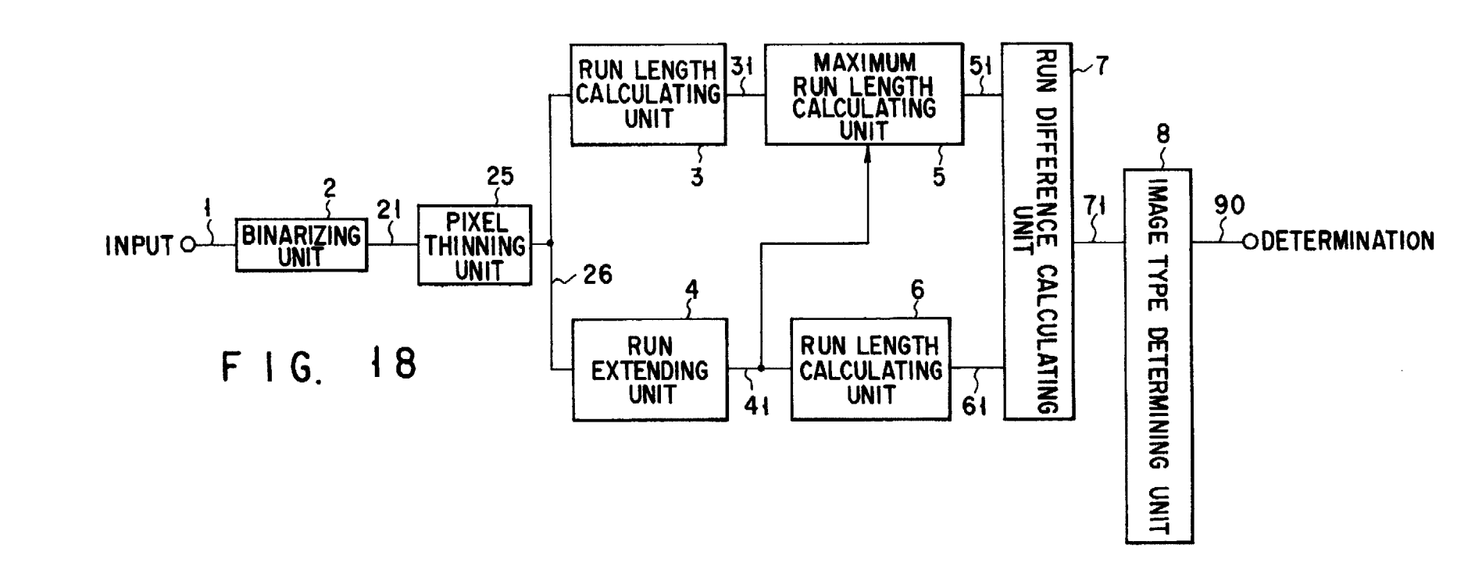
FIG. 18 is a block diagram showing the arrangement of an image processing apparatus according to the fourth embodiment of the present invention.

FIG. 18 is a schematic view showing the arrangement of an image processing apparatus according to the fourth embodiment of the present invention. Referring to FIG. 18, reference numeral 1 denotes an input image signal; 2, a binarizing unit for binarizing an input signal; 21, a binary image signal; 25, a pixel thinning unit; 26, a thinned binarized signal; 3, a run length calculating unit; 31, a run length signal; 4, a run extension unit; 41, an extended run signal; 5, a maximum run length calculating unit; 51, a maximum run length signal; 6, a run length calculating unit; 61, a run length signal; 75, a run ratio calculating unit; 76, a run ratio signal; 8, an image type determining unit; and 90, a determination signal. In this embodiment, since the input image signal 1, the binarizing unit 2, the run length calculating unit 3, the run extension unit 4, the maximum run length calculating unit 5, the run length calculating unit 6, and the image type determining unit 8 are the same as those in the first embodiment in FIG. 1, a description thereof will be omitted, and only different parts will be described below.

The pixel thinning unit 25 performs a thinning process for the pixels of an input image. More specifically, the number of pixels is reduced to reduce a memory capacity in a process of the subsequent stage and make the process speed high. This thinning process is performed every two pixels. If one of the two pixels is a black pixel, black is output. Therefore, the maximum frequency of an output from the image thinning unit 25 is ½ the maximum frequency of the input to the image thinning unit 25.

Figure 19:
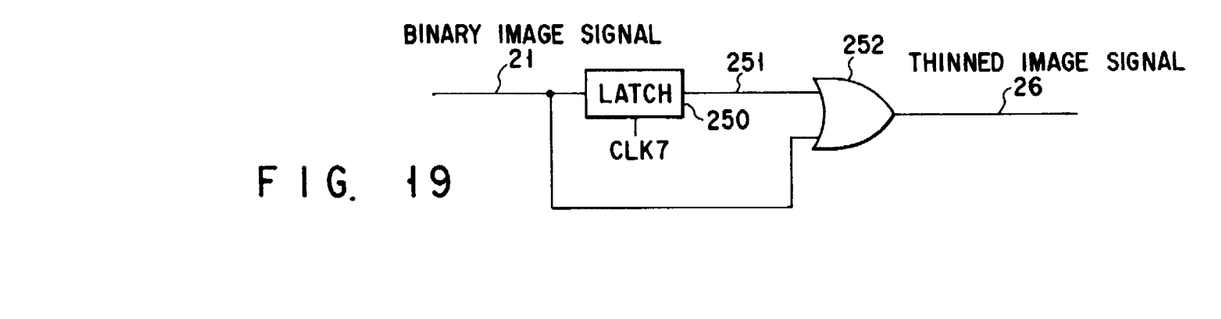
FIG. 19 is a diagram showing a circuit arrangement of a pixel thinning unit 25 in FIG. 18.

FIG. 19 shows a circuit arrangement of the image thinning unit 25. The image thinning unit 25 is constituted by a latch 250 and an OR gate 252, and outputs the thinned binarized signal 26. In an image processing apparatus using information obtained by extending a run, when pixels are simply thinned, information representing a thin line having a width corresponding to one dot may be lost. In the above embodiment, however, such information is not lost, and the process cost can be reduced.

In addition, although the above embodiment shows the case wherein the image thinning unit 25 thins every two pixels, a thinning process for every four or more pixels can be performed by expanding an OR gate.

As has been described above, according to the present invention, even if the image is a document image in which a character area, a half-tone area, and a half-tone area are mixed with each other, a type of image can be correctly determined, i.e., the character area, the half-tone area, and the photograph area can be correctly determined. In particular, a half-tone area, having a small number of lines, which is not easily determined in a conventional technique can be determined with a higher accuracy. In addition, the image processing apparatus can be constituted by simple hardware because a line memory or the like is not required. When an appropriate binarizing/gradation processing scheme is used, a character area can be binarized with a high resolution, and photograph and half-tone areas can be binarized with good gradation.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image processing apparatus for determining an image type of each area in an image, comprising:

binarizing means for binarizing an input image signal to provide binary image data consisting of first and second values;

run length calculating means for calculating, on the basis of the binary image data provided by said binarizing means, a length of a run representing a continuation of the binary image data having the first value;

run extension means for replacing a pixel having the second value with a pixel having the first value with respect to the binary image data provided by said binarizing means to extend the run so as to provide an extended run;

maximum run length calculating means for calculating a maximum run length of run lengths calculated by said run length calculating means within a range of the extended run provided from said run extension means;

extended run length calculating means for calculating a length of the extended run provided from said run extension means; and determining means for determining an image type of the input image signal on the basis of the extended run length calculated by said extended run length calculating means and the maximum run length calculated by said maximum run length calculating means.

2. An apparatus according to claim 1, wherein the run extension means includes means for, when there is a pixel having the first value in a specific direction from a position of a target pixel having the first value within a specific pixel count range, replacing all image data between the target pixel and the pixel with the first value with respect to the binary image data provided by said binarizing means to extend the run, thereby providing an extended run.

3. An apparatus according to claim 1, wherein the image signal is a signal obtained by scanning an image in a main scanning direction and a sub-scanning direction perpendicular to the main scanning direction, and the specific direction of said run extension means is the main scanning direction.

4. An apparatus according to claim 1, wherein said binarizing means further comprises:

thinning means for thinning off the binary image data, said thinning means outputting one image data with respect to a predetermined number of continuous binary image data, and said thinning means outputting the first value when there is at least one image data having the first value within the predetermined number of binary image data.

5. An apparatus according to claim 1, wherein said determining means has deciding means for deciding an image type of the input image signal on the basis of a difference between the extended run length calculated by said extended run length calculating means and the maximum run length calculated by said maximum run length calculating means.

6. An apparatus according to claim 5, wherein said deciding means has means for deciding the image type as a character, when the difference between the extended run length and the maximum run length is smaller than a predetermined threshold, and deciding the image type as half-tone when the difference is not less than the predetermined threshold.

7. An apparatus according to claim 1, wherein said determining means has deciding means for deciding an image type of the input image signal on the basis of a ratio of the extended run length calculated by said extended run length calculating means to the maximum run length calculated by said maximum run length calculating means.

8. An apparatus according to claim 5, wherein said deciding means has means for deciding the image type as a character when the ratio of the extended run length to the maximum run length (maximum run length/extended run length) is smaller than a predetermined threshold, and deciding the image type as half-tone when the ratio is not less than the predetermined threshold.

9. An image processing apparatus for determining an image type of each area in an image, comprising:

binarizing means for binarizing an input image signal to provide binary image data consisting of first and second values;

run length calculating means for calculating, on the basis of the binary image data provided by said binarizing means, a length of a run representing a continuation of the binary image data having the first value;

run extension means for replacing a pixel having the second value with a pixel having the first value with respect to the binary image data provided by said binarizing means to extend the run so as to provide an extended run;

maximum run length calculating means for calculating a maximum run length of run lengths calculated by said run length calculating means within a range of the extended run provided from said run extension means;

extended run length calculating means for calculating a length of the extended run provided from said run extension means;

first determining means for determining an image type of the input image signal on the basis of the extended run length calculated by said extended run length calculating means and the maximum run length calculated by said maximum run length calculating means, and providing a first determination signal representing a determination result; and second determining means for calculating, on the basis of the input image signal, a maximum density difference signal representing a density difference between a pixel of a maximum density and a pixel of a minimum density in an area of a predetermined size, determining an image type of the input image signal on the basis of the maximum density difference signal, and providing a second determination signal representing a determination result; and total determining means for totally determining the image type of the input image signal on the basis of the first determination signal provided from said first determining means and the second determination signal provided from said second determining means.

10. An apparatus according to claim 9, wherein the run extension means includes means for, when there is a pixel having the first value in a specific direction from a position of a target pixel having the first value within a specific pixel count range, replacing all image data between the target pixel and the pixel with the first value with respect to the binary image data provided by said binarizing means to extend the run, thereby providing an extended run.

11. An apparatus according to claim 9, further comprising:

storing means for storing at least the first determination signal provided from said first determining means; and storage control means for controlling input and output of the first determination signal to and from said storing means, said storage control means providing the first determination signal to said total determining means such that the first determination signal is synchronized with the second determination signal.

12. An image processing apparatus for determining whether an image is a character image or a half tone image, comprising:

binarizing means for binarizing an input image signal to output binary image data consisting of black and white data;

first run length calculating means for calculating, on the basis of the binary image data provided by said binarizing means, a length of a run representing a continuation of black pixels in a specific direction;

extending means for converting a white pixel adjacent in a specific direction to a black pixel into the black pixel with respect to the binary image data provided by said binarizing means to extend the run so as to provide an extended run;

second run length calculating means for calculating a length of the extended run, from the binary image data converted by said extending means; and determining means for determining whether the image is a character image or a half-tone image on the basis of a difference between the run length calculated by said first run length calculating means and the extended run length calculated by said second run length calculating means.

* * * * *